United States Patent [19]

Fischer et al.

[11] Patent Number: 5,209,424
[45] Date of Patent: May 11, 1993

[54] SINGLE REEL CARTRIDGE WITH THINNER COVER AND DEEP LABEL RECESS

[75] Inventors: Steven J. Fischer, Wahpeton, N. Dak.; Steven E. Krabbenhoft, Breckenridge, Minn.; Curtis G. LeNoue, Wahpeton, N. Dak.; Navnit C. Patel, Wahpeton, N. Dak.; Saurin J. Shah, Wahpeton, N. Dak.

[73] Assignee: Minnesota Mining and Manufacturing Company, St. Paul, Minn.

[21] Appl. No.: 756,068

[22] Filed: Sep. 6, 1991

[51] Int. Cl.5 ............................................. G11B 33/00
[52] U.S. Cl. ................................................... 242/197
[58] Field of Search .................... 242/195, 197, 199; 360/132; 206/508

[56] References Cited

U.S. PATENT DOCUMENTS

| | | | |
|---|---|---|---|
| 2,487,400 | 11/1949 | Tupper | 220/DIG. 12 |
| 4,206,845 | 6/1980 | Christian | 206/508 |
| 4,383,660 | 5/1983 | Richard et al. | 242/197 |
| 4,426,047 | 1/1984 | Richard et al. | 242/197 |
| 4,452,406 | 6/1984 | Richard | 242/195 |
| 4,473,165 | 9/1984 | Lentjes | 206/508 |
| 4,700,842 | 10/1987 | Grusin | 206/508 |
| 4,747,510 | 5/1988 | Mack | 206/508 |
| 4,775,115 | 10/1988 | Gelardi | 242/195 |
| 5,021,351 | 6/1991 | Ervin | 206/508 |

Primary Examiner—Joseph J. Hail III
Assistant Examiner—John Q. Nguyen
Attorney, Agent, or Firm—Gary L. Griswold; Walter N. Kirn; Charles D. Levine

[57] ABSTRACT

A single reel data tape cartridge includes a base and a cover. The cover includes a rear wall, two opposing side walls, a front wall, and an upper wall connecting the rear, front, and side walls. The upper wall has an upper surface and a lower surface. The upper surface has a substantially rectangular recessed portion which is adapted to receive an identifying label and to receive ribs on the base of an adjacent cartridge when a plurality of cartridges are stacked. The upper wall is formed with a stepped wall thickness such that the portion of the lower surface corresponding in location to the recessed portion has an increased stepped portion. The depth of the recessed portion varies and is greater adjacent its edges.

20 Claims, 2 Drawing Sheets

SINGLE REEL CARTRIDGE WITH THINNER COVER AND DEEP LABEL RECESS

TECHNICAL FIELD

The present invention relates to tape cartridge covers. More particularly, the present invention relates to tape cartridge covers for use in single reel cartridges.

BACKGROUND OF THE INVENTION

Single reel data tape cartridges, known as 3480 type cartridges, include a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the takeup reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes a roller guide, an air bearing guide, a magnetic transducer head, a second air bearing guide, and a roller of a tension transducer.

The cartridge is formed of a base and a cover. The base includes a rear wall, two opposing side walls, a front wall, and a lower wall connecting the rear, front, and side walls. The cover includes a rear wall, two opposing side walls, a front wall, and an upper wall connecting the rear, front, and side walls. The upper wall has an upper surface and a lower surface. The upper surface has a substantially rectangular recessed portion which is adapted to receive an identifying label and to receive ribs on the base of an adjacent cartridge when a plurality of cartridges are stacked one on top of the other. The thickness of the upper wall is substantially constant, generally being 0.20 cm (0.08 in) thick except for the 0.05 cm (0.02 in) deep recess.

It is known that increasing the depth of the recess will improve the stackability of these cartridges. Recesses up to 0.08 cm (0.03 in) deep can be attained without unduly increasing the thickness of the upper walls and still remaining within ANSI standards.

However, there is a need to provide cartridge covers that are thinner without sacrificing any of the strength of the currently-dimensioned covers. There is also a need to provide cartridge covers that have a deeper recess to improve the stacking engagement between ribs of one cartridge and the recess of another cartridge. There are no known cartridges that combine thinner cover walls with deeper recesses to improve stacking while saving material and reducing costs without sacrificing strength.

SUMMARY OF THE INVENTION

A single reel data tape cartridge according to the present invention includes a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered. The cartridge is formed of a base and a cover. The base includes a rear wall, two opposing side walls, a front wall, and a lower wall connecting the rear, front, and side walls.

The cover includes a rear wall, two opposing side walls, a front wall, and an upper wall connecting the rear, front, and side walls. The upper wall has an upper surface and a lower surface. The upper surface has a substantially rectangular recessed portion which is adapted to receive an identifying label and to receive ribs on the base of an adjacent cartridge when a plurality of cartridges are stacked one on top of the other. The upper wall is formed with a stepped wall thickness such that the portion of the lower surface corresponding in location to the recessed portion has an increased stepped portion. The depth of the recess is greater than the depth of the increased stepped portion. The depth of the recessed portion varies and is greater adjacent its edges than at its center.

DETAILED DESCRIPTION OF PREFERRED EMBODIMENTS

Figure 1:
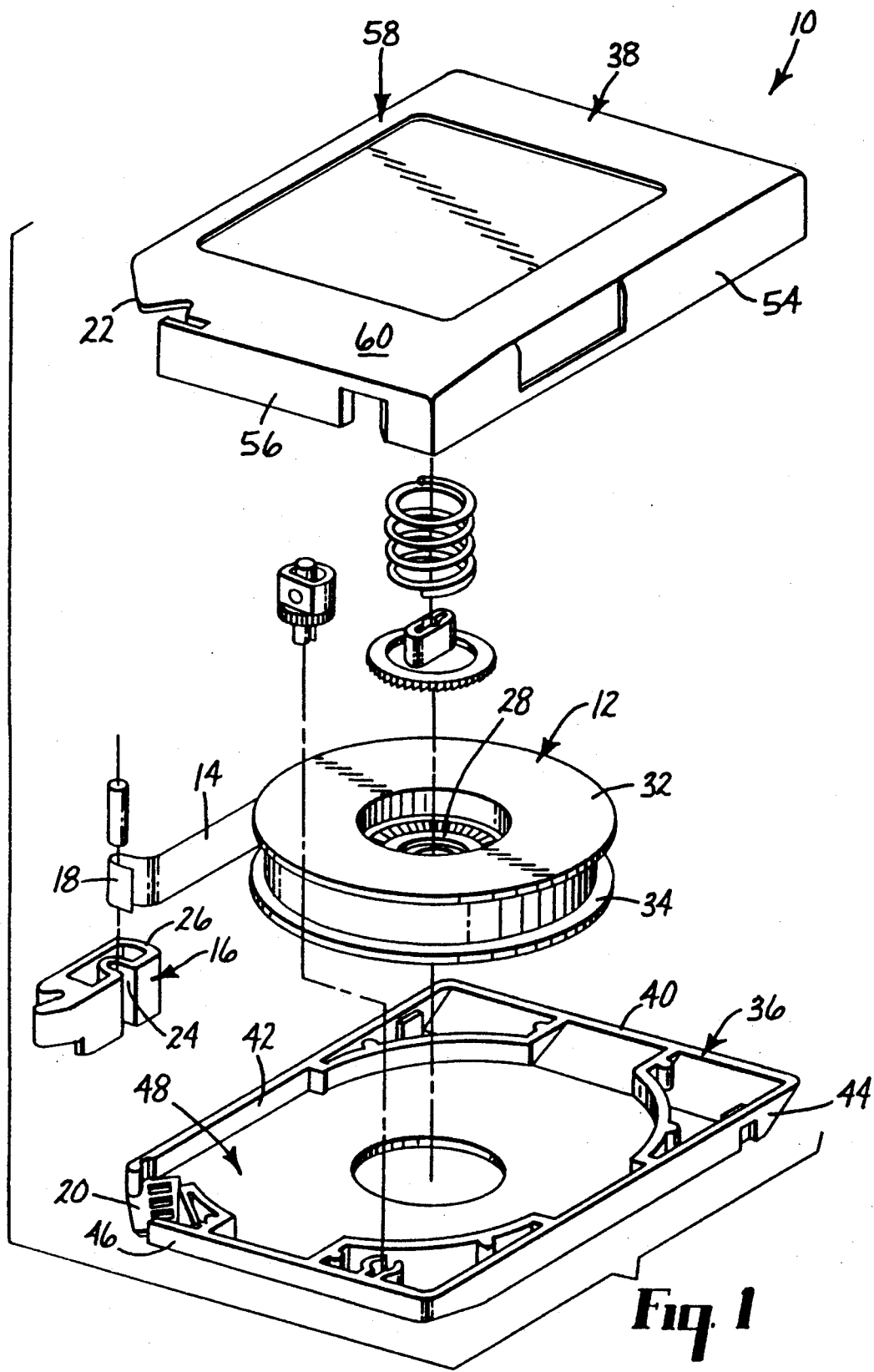
FIG. 1 is a perspective view of a single reel tape cartridge having a cover of the present invention.

A single reel data tape cartridge 10, such as a 3480 type tape cartridge shown in FIG. 1, includes a tape reel 12 containing a plurality of layers of magnetic tape 14 with a leader block 16 attached to the free end 18 of the tape 14 as it extends from the reel 12. The tape reel 12 includes a cylindrical hub having a cylindrical tape winding surface, an upper flange mounted on one axial end of the hub, and a lower flange mounted on the other axial end of the hub. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window 22 is covered.

The front surface of the leader block 16 includes a slot 24 for engaging an automatic threading apparatus of a reel-to-reel magnetic tape drive apparatus and engages an inclined surface of the corner of the cartridge. The rear surface is rounded 26 to form a portion of an arc of a radius to match the periphery of the takeup reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel.

The tape reel 12 includes a cylindrical hub 28 having a cylindrical tape winding surface, an upper flange 32 mounted on one axial end of the hub, and a lower flange 34 mounted on the other axial end of the hub.

The cartridge 10 is formed of a base and a cover 38. The base 36 includes a rear wall 40, two opposing side walls 42, 44, a front wall 46, and a lower wall 48 connecting the rear, front, and side walls. The cover 38 includes a rear wall 50, two opposing side walls 52, 54, a front wall 56, and an upper wall 58 connecting the rear, front, and side walls.

Figure 2:
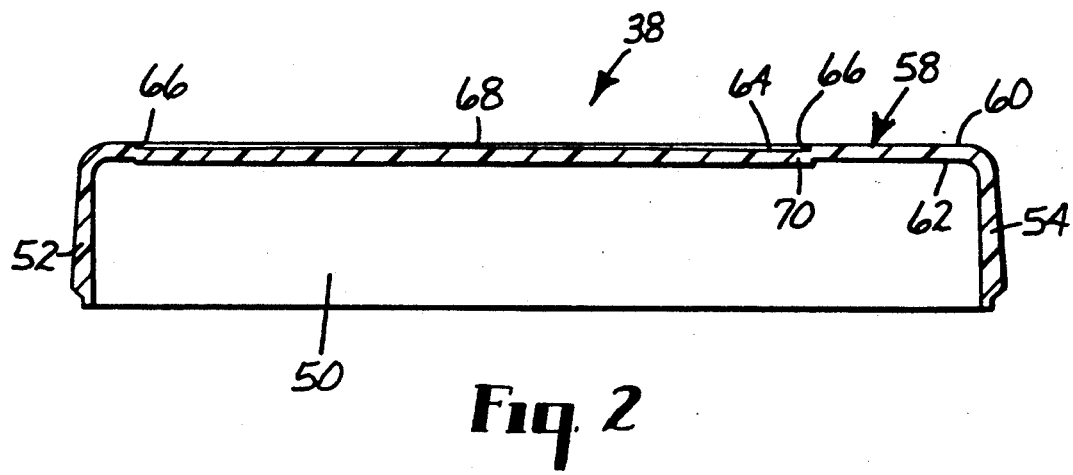
FIG. 2 is a cross-sectional view of the cover taken along line 2—2 of FIG. 1.

Referring to FIG. 2, the upper wall 58 of the cover 38 has an upper surface 60 and a lower surface 62. The upper surface 60 has a substantially rectangular recessed portion 64 which is adapted to receive an identifying label and to receive ribs on the base of an adjacent cartridge when a plurality of cartridges 10 are stacked one on top of the other. The ANSI standards for these cartridges 10 specify that the depth of the recessed portion 64 be 0.05±0.025 cm (0.020±0.010 in). To provide a superior interface for the stacking ribs the depth of the recessed portion 64 is 0.068 cm (0.027 in) along the edges 66 of the recessed portion 64. To maintain the strength of the upper wall 58 while increasing the recessed portion depth, the depth is not constant. Rather, the recessed portion 64 has a varying depth, reaching a maximum at the edges 66, where the stacking bars engage. At the center 68 of the recessed portion 64, the depth is more conventional and is reduced to 0.05 cm (0.020 in). Thus, the depth of the recessed portion 64 is 35% greater adjacent its edges 66 than at its center 68. The increased depth at the edge 66 enables better stacking of adjacent cartridges.

Figure 3:
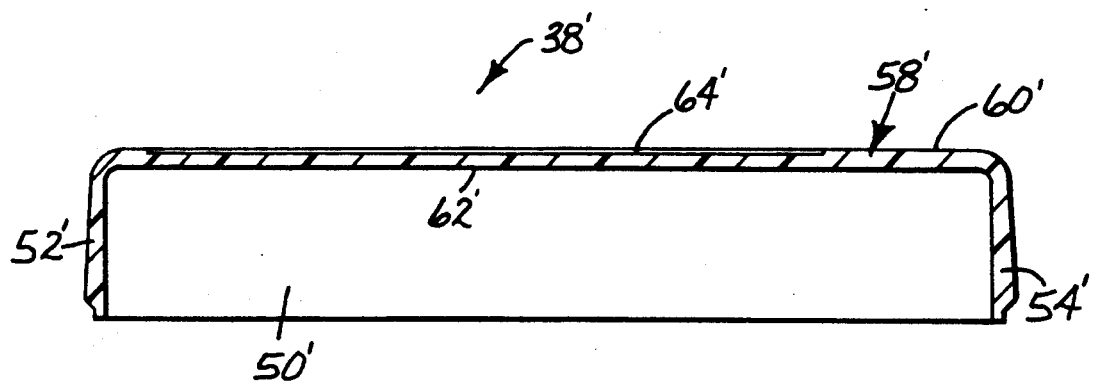
FIG. 3 is a cross-sectional view of a prior art cartridge cover.

A further modification of the cartridge cover 38 is that it is thinner than known covers. The cover 38 is reduced to a maximum total thickness of 0.18 cm (0.07 in) from the 0.20 cm (0.08 in) thickness of conventional cartridge covers as shown in FIG. 3. This reduces manufacturing costs and requires less material.

To achieve the benefits of a thinner cover upper wall 58 without reducing the depth of the recessed portion 64, a stepped portion 70 is formed on the lower surface 62 of the upper wall 58. The stepped portion 70 reduces the flexibility of the cover 38 and enables the thinner cover 38 to conform to ANSI standards. Moreover, the stepped portion 70 also enables the use of a thinner cover upper wall 58 in combination with increasing the depth of the recessed portion 64. The stepped portion 70 corresponds in location to the recessed portion 64 and thickens the area under the recessed portion 64 and maintain sufficient strength.

Figure 4:
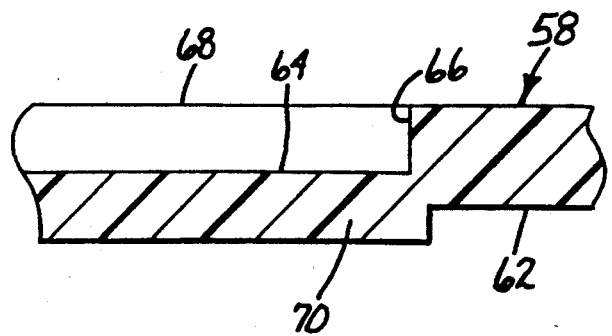
FIG. 4 is an enlarged fragmentary cross-sectional view of a portion of the cover illustrating relative dimensions.

The depth of the recessed portion 64 is greater than the thickness of the increased portion 70. Preferably, the depth of the recessed portion 64 is at least two times greater than the depth of the stepped portion 70, with the recessed portion depth ranging from 0.05 cm (0.020 in) to 0.068 cm (0.027 in) and the thickness of the stepped portion 70 being 0.025 cm (0.010 in). This relationship is best illustrated in FIG. 4.

The stepped portion 70 also improves the processability and dimensional stability of the cover. The gate for molding the cover is located in the center of the recessed portion 64, a relatively thick portion of the cover 38. Thus, the filling of the plastic mold material and the pressure distribution during the packing stage of molding is uniform. Processability is improved due to the lower pressure drop in this thicker area which is produced during the filling and packing stages of the molding process. The lower pressure drop during packing leads to lower packing pressures and lower molded-in stresses. Also, the improved processability permits the reduction of the nominal thickness of the cover. This, in turn, helps reduce material usage and decreases the cycle time for processing parts.

This cartridge cover 38 is thinner than existing covers without sacrificing any of the strength of the currently-dimensioned covers. Additionally, this cartridge cover 38 has a deeper recessed portion 64 to improve the stacking engagement between ribs of one cartridge and the recess of another cartridge.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. An injection molded cartridge cover for use in a tape cartridge insertable into a tape drive apparatus, the cartridge cover comprising:
 a rear wall;
 two opposing side walls;
 a front wall; and
 an upper wall connecting the rear, front, and side walls, wherein the upper wall has an upper surface and a lower surface;
 a substantially rectangular recessed portion located on the upper surface of the upper wall, wherein the recessed portion is adapted to receive an identifying label and is adapted to receive ribs on the base of an adjacent cartridge when a plurality of cartridges are stacked one on top of the other, and wherein the depth of every point in the recessed portion is less than the depth of the upper wall outside the area of the recessed portion; and
 a stepped portion located on a portion of the upper wall corresponding in location to the recessed portion and extending from the lower surface of the upper wall, wherein the depth of the stepped portion is defined as extending from the plane in the upper wall coplanar with the lower surface.

2. The cartridge cover of claim 1 wherein the depth of the recessed portion is greater than the depth of the stepped portion.

3. The cartridge cover of claim 2 wherein the depth of the recessed portion is at least two times greater than the depth of the stepped portion.

4. The cartridge cover of claim 1 wherein the depth of the recessed portion varies.

5. The cartridge cover of claim 4 wherein the depth of the recessed portion is greater adjacent its edges than at its center.

6. The cartridge cover of claim 5 wherein the depth of the recessed portion is 35% greater adjacent its edges than at its center.

7. The cartridge cover of claim 1 wherein the depth of the cover in the area including the stepped portion is less than the depth of the cover in the area outside of the stepped portion.

8. The cartridge cover of claim 1 wherein the depth of the cover in areas outside of the stepped portion is less than 0.08 inches.

9. An injection molded cartridge cover for use in a tape cartridge insertable into a tape drive apparatus, the cartridge cover comprising:
a rear wall;
two opposing side walls;
a front wall;
an upper wall connecting the rear, front, and side walls, wherein the upper wall has an upper surface and a lower surface; and
a substantially rectangular recessed portion located on the upper surface of the upper wall, wherein the recessed portion is adapted to receive an identifying label and is adapted to receive ribs on the base of an adjacent cartridge when a plurality of cartridges are stacked one on top of the other, wherein the depth of the recessed portion varies, wherein the depth of the recessed portion is greater adjacent its edges than at its center, and wherein the depth of every point in the recessed portion is less than the depth of the upper wall outside the area of the recessed portion.

10. The cartridge cover of claim 9, wherein the depth of the recessed portion is 35% greater adjacent its edges than at its center.

11. A single reel tape cartridge insertable into a tape drive apparatus comprising:
a leader block;
a length of tape connected at one end to the leader block;
a tape reel on which the tape is wound;
a base; and
an injection molded cover, wherein the cover comprises a rear wall; two opposing side walls; a front wall; and an upper wall connecting the rear, front, and side walls; wherein the upper wall has an upper surface, a lower surface, a substantially rectangular recessed portion located on the upper surface, and a stepped portion located on a portion of the upper wall corresponding in location to the recessed portion and extending from the lower surface of the upper wall, wherein the depth of the stepped portion is defined as extending from the plane in the upper wall coplanar with the lower surface, wherein the recessed portion is adapted to receive an identifying label and is adapted to receive ribs on the base of an adjacent cartridge when a plurality of cartridges are staked one on top of the other, and wherein the depth of every point in the recessed portion is less than the depth of the upper wall outside the area of the recessed portion.

12. The tape cartridge of claim 11 wherein the depth of the recessed portion is greater than the depth of the stepped portion.

13. The tape cartridge of claim 12 wherein the depth of the recessed portion is at least two times greater than the depth of the stepped portion.

14. The tape cartridge of claim 11 wherein the depth of the recessed portion varies.

15. The tape cartridge of claim 14 wherein the depth of the recessed portion is greater adjacent its edges than at its center.

16. The tape cartridge of claim 15 wherein the depth of the recessed portion is 35% greater adjacent its edges than at its center.

17. The tape cartridge of claim 11 wherein the depth of the cover in the area including the stepped portion is less than the depth of the cover in the area outside of the stepped portion.

18. The cartridge cover of claim 11 wherein the depth of the cover in areas outside of the stepped portion is less than 0.08 inches.

19. A single reel tape cartridge insertable into a tape drive apparatus comprising:
a leader block;
a length of tape connected at one end to the leader block;
a tape reel on which the tape is wound;
a base; and
an injection molded cover, wherein the cover comprises a rear wall; two opposing side walls; a front wall; and an upper wall connecting the rear, front, and side walls; wherein the upper wall has an upper surface, a lower surface, and a substantially rectangular recessed portion located on the upper surface, wherein the recessed portion is adapted to receive an identifying label and is adapted to receive ribs on the base of an adjacent cartridge when a plurality of cartridges are stacked one on top of the other, wherein the depth of the recessed portion varies, wherein the depth of the recessed portion is greater adjacent its edges than at its center, and wherein the depth of every point in the recessed portion is less than the depth of the upper wall outside the area of the recessed portion.

20. The tape cartridge of claim 19 wherein the depth of the recessed portion is 35% greater adjacent its edges than at its center.

* * * * *